United States Patent
Yun et al.

(10) Patent No.: US 9,289,937 B2
(45) Date of Patent: Mar. 22, 2016

(54) FILTER FABRICATION METHOD AND THE FILTER FORMED THEREBY

(75) Inventors: Yong Ju Yun, Daejeon (KR); Han Young Yu, Daejeon (KR); Yark Yeon Kim, Daejeon (KR); Won Ick Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 751 days.

(21) Appl. No.: 13/615,042

(22) Filed: Sep. 13, 2012

(65) Prior Publication Data

US 2013/0075326 A1    Mar. 28, 2013

(30) Foreign Application Priority Data

Sep. 27, 2011    (KR) .................... 10-2011-0097708

(51) Int. Cl.
| | |
|---|---|
| *B29C 33/56* | (2006.01) |
| *B29C 33/58* | (2006.01) |
| *B29C 33/60* | (2006.01) |
| *B29C 33/62* | (2006.01) |
| *B29C 33/64* | (2006.01) |
| *B29C 47/30* | (2006.01) |
| *B29C 37/00* | (2006.01) |
| *D01D 5/00* | (2006.01) |
| *B29C 47/00* | (2006.01) |

(52) U.S. Cl.
CPC .............. *B29C 47/30* (2013.01); *B29C 37/0067* (2013.01); *B29C 47/0009* (2013.01); *D01D 5/0038* (2013.01); *D01D 5/0076* (2013.01)

(58) Field of Classification Search
CPC ........ B29C 33/56; B29C 33/58; B29C 33/60; B29C 33/62; B29C 33/64; B29C 37/0067; D01D 5/003; D01D 5/0038; D01D 5/0046; D01D 5/0076
USPC ............ 264/10, 337, 338, 464, 465, 466, 484
See application file for complete search history.

(56) References Cited

U.S. PATENT DOCUMENTS

| | | | |
|---|---|---|---|
| 2008/0149561 A1 | 6/2008 | Chu et al. | |
| 2009/0189319 A1* | 7/2009 | Kim | ............................. 264/484 |
| 2009/0326128 A1* | 12/2009 | Macossay-Torres | ...... 264/465 X |
| 2010/0317790 A1* | 12/2010 | Jang et al. | ................. 264/465 X |

FOREIGN PATENT DOCUMENTS

KR    10-2010-0105179 A    9/2010

OTHER PUBLICATIONS

Zongping Chen et al., "Three-dimensional flexible and conductive interconnected graphene networks grown by chemical vapour deposition", Nature Materials, Jun. 2011, pp. 424-428, vol. 10, Macmillan Publishers Limited.

(Continued)

*Primary Examiner* — Leo B Tentoni

(57) ABSTRACT

Provided are a filter fabrication method and the filter formed thereby. In this method, a three-dimensional graphene polymer complex filter can be easily fabricated. By forming various patterns at a surface of a collector, patterns can be simply formed at a surface of a filter. This provides advantages at control of pressure difference which can be one of the very important factors necessary for designing and fabricating a filter. Since the filter includes graphene particles homogeneously combined to the polymer nanofiber, the filter can represent a superior antibiosis.

16 Claims, 9 Drawing Sheets

(56) References Cited

OTHER PUBLICATIONS

Wenbing Hu et al., "Graphene-Based Antibacterial Paper", ACS Nano, 2010, pp. 4317-4323, vol. 4 No. 7, American Chemical Society.

Qiaoliang Bao et al., "Graphene-Polymer Nanofiber Membrane for Ultrafast Photonics", Advanced Functional Materials, 2010, pp. 782-791, Wiley-VCH.

\* cited by examiner

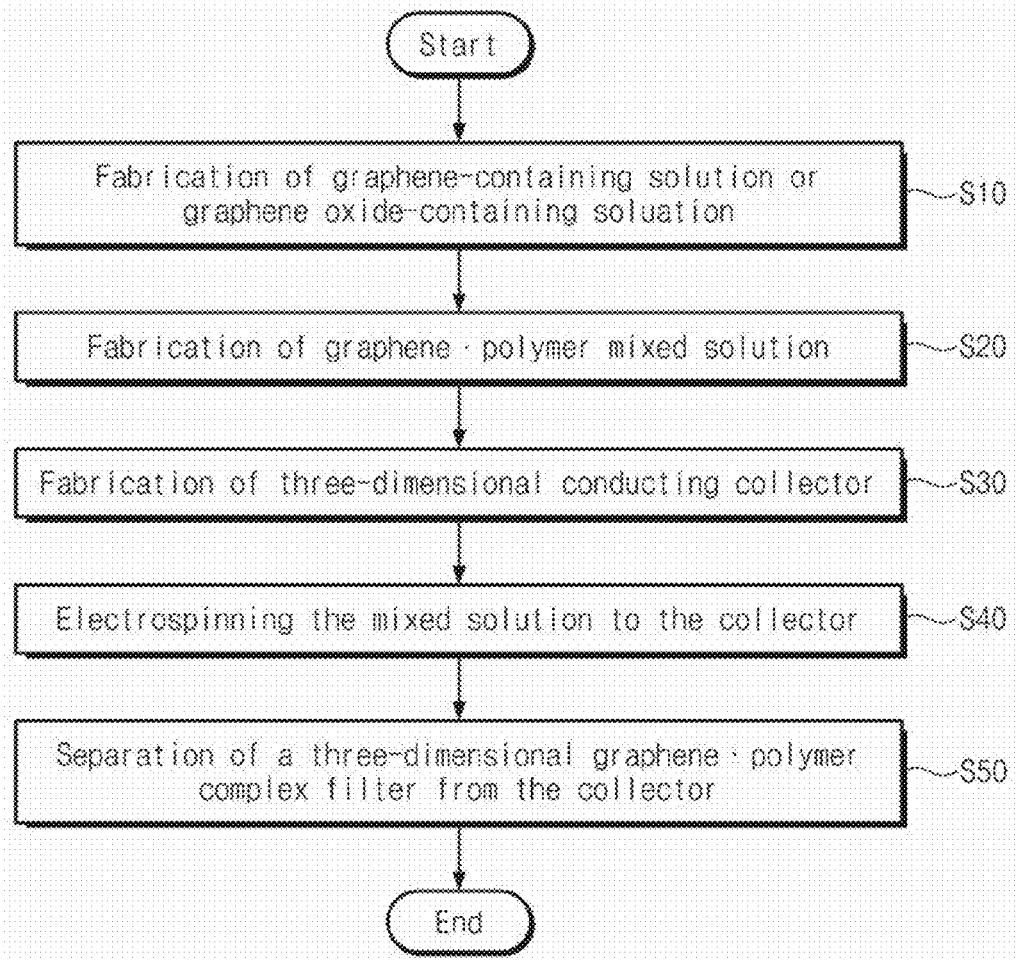

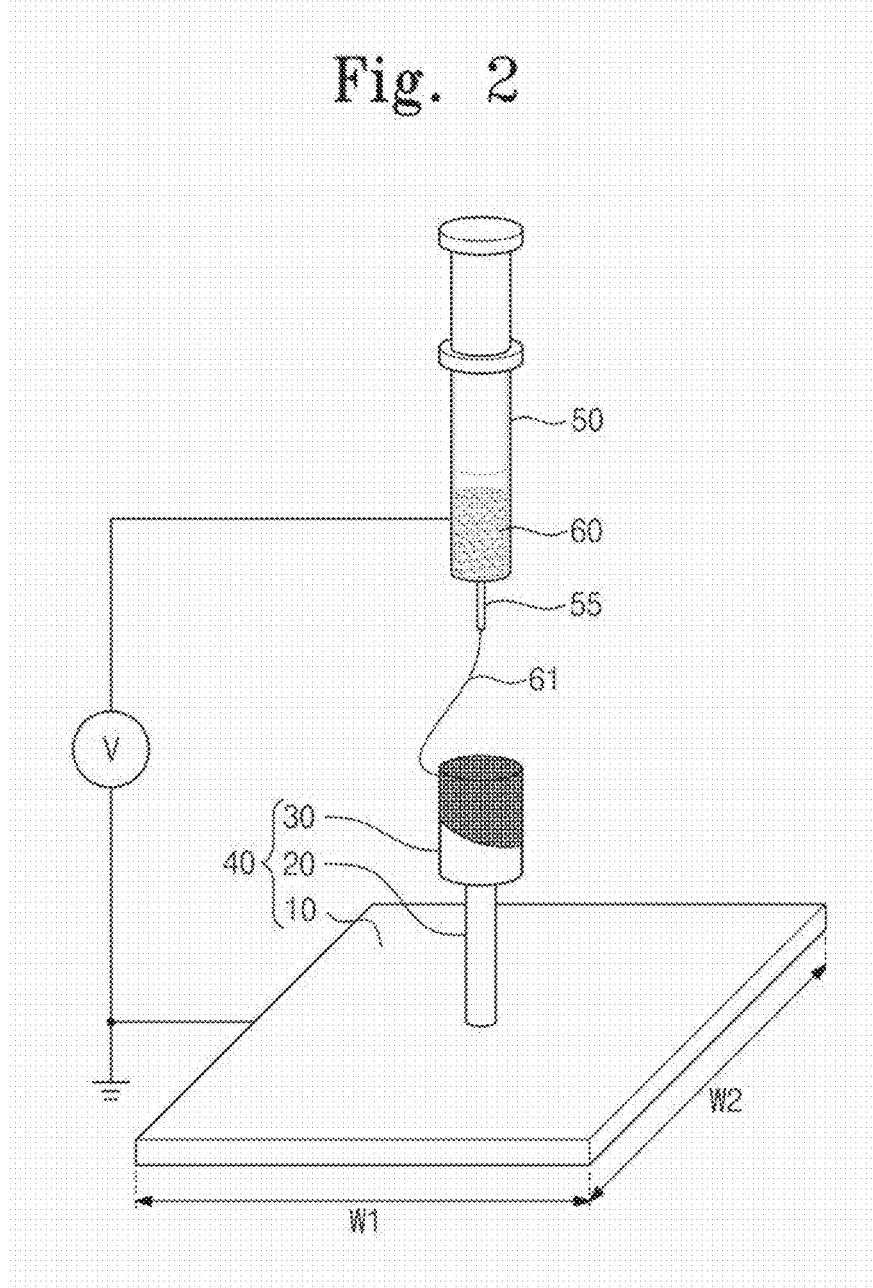

FILTER FABRICATION METHOD AND THE FILTER FORMED THEREBY

CROSS-REFERENCE TO RELATED APPLICATIONS

This U.S. non-provisional patent application claims priority under 35 U.S.C. §119 of Korean Patent Application No. 10-2011-0097708, filed on Sep. 27, 2011, the entire contents of which are hereby incorporated by reference.

BACKGROUND

The present disclosure herein relates to a filter fabrication method and the filter formed thereby.

As the modern industry have rapidly developed, environmental pollution problem has been important. As one of solutions capable of solving the environmental pollution problem, filters have been actively studied for eliminating various harmful materials. The filters can be broadly used for a water purifying equipment and an incinerator in order to adsorb and eliminate harmful gases. Furthermore, the filter can be used for home appliances such as a water purifier, an air conditioner and air cleaner and also used for a medical device in order to filter a cell (for example, a leukocyte) of a certain size in blood. The filters used for the home appliances or medical devices are required to have a superior antibiosis and a three dimensional shape along installed positions of the filters in the devices.

SUMMARY

The present disclosure provides a filter fabrication method capable of more easily fabricating a filter with a superior antibiosis and a three dimensional shape.

The present disclosure provides a filter with a superior antibiosis and a three dimensional shape.

Embodiments of the inventive concept provide a method of fabricating a filter, including: fabricating a graphene-containing solution or a graphene oxide-containing solution; fabricating a graphene-polymer mixed solution by mixing a polymer with the graphene-containing solution or with the graphene oxide-containing solution; fabricating a conducting collector of a three-dimensional shape; forming a three dimensional graphene•polymer complex filter by electrospinning the mixed solution to a surface of the collector; and separating the three-dimensional graphene polymer complex filter from the collector.

The fabricating of the graphene-containing solution or the graphene oxide-containing solution may include dispersing graphene particles or graphene oxide particles in a solvent.

The solvent may be at least one selected from a group consisting of water, acetic acid ($C_2H_4O_2$), acetone ($C_3H_6O$), acetonitrile ($C_2H_3N$), benzene ($C_6H_6$), 1-butanol ($C_4H_{10}O$), 2-butanol ($C_4H_{10}O$), 2-butanone ($C_4H_8O$), t-butyl alcohol ($C_4H_{10}O$), carbon tetrachloride ($CCl_4$), chlorobenzene ($C_6H_5Cl$), chloroform ($CHCl_3$), cyclohexane ($C_6H_{12}$), 1,2-dichloroethane, ($C_2H_4Cl_2$), chlorobenzene, dichloromethane ($CH_2Cl_2$), ethyl ether ($C_4H_{10}O$), diethylene glycol ($C_4H_{10}O_3$), diglyme (diethylene glycol, dimethyl ether) ($C_6H_{14}O_3$), 1,2-dimethoxy-ethane (glyme, DME) ($C_4H_{10}O_2$), dimethylether ($C_2H_6O$), dimethyl-formamide (DMF) ($C_3H_7NO$), dimethyl sulfoxide (DMSO) ($C_2H_6OS$), dioxane ($C_4H_8O2$), ethanol ($C_2H_6O$), ethyl acetate ($C_4H_8O_2$), ethylene glycol ($C_2H_6O_2$), glycerin ($C_3H_8O_3$), heptanes ($C_7H_{16}$), hexamethylphosphoramide (HMPA) ($C_6H_{18}N_3OP$), hexamethylphosphorous triamide (HMPT) ($C_6H_{18}N_3P$), hexane ($C_6H_{14}$), methanol, ($CH_4O$), methyl t-butyl ether (MTBE) ($C_5H_{12}O$), methylene chloride, ($CH_2Cl_2$), N-methyl-2-pyrrolidinone (NMP) ($CH_5H_9NO$), nitromethane ($CH_3NO_2$), pentane ($C_5H_{12}$), petroleum ether (ligroine), 1-propanol ($C_3H_8O$), 2-propanol ($C_3H_8O$), pyridine ($C_5H_5N$), tetrahydrofuran (THF) ($C_4H_8O$), toluene ($C_7H_8$), triethyl amine ($C_6H_{15}N$), o-xylene ($C_8H_{10}$), m-xylene ($C_8H_{10}$), and p-xylene ($C_8H_{10}$).

The polymer may be at least one selected from a group consisting of nylon-6,6), polyamide-6,6, polyurehthanes (PU), polybenzimidazole (PBI), polycarbonate (PC), polyacrylonitrile (PAN), polyvinyl alcohol (PVA), polylactic acid (PLA), polyethylene-co-vinyl acetate (PEVA), poly methyl methacrylate (PMMA), polyethylene oxide, polyaniline, (PANT), polystyrene (PS), polyvinylcarbazole, polyethylene terephthalate, (PET), polyvinyl phenol (PVP), polyvinylchloride (PVC), celluloid, cellulose acetate, polyacrylamide (PAAm), polycaprolactone (PCL), polyvinylidene fluoride (PVDF), polyetherimide, polyimide, polyethylene naphthalate (PEN), collagen, fibrin, chitosan and gelatin.

The method may further include electrospinning a separation polymer solution to the surface of the collector before electrospinning the mixed solution to a surface of the collector.

The collector may include a supporter part and a three-dimensional shape part disposed on the supporter part and the three-dimensional graphene polymer complex filter may cover an upper surface and a sidewall of the shape part.

A pattern of a line, circle, polygon, letter or picture may be formed at a surface of the shape part.

In one example, the pattern may include a plurality of lines and the three-dimensional graphene•polymer complex filter may include a polymer nanofiber and graphene particles or graphene oxide particles combined to the polymer nanofiber. At this time, the polymer nanofiber may be formed to cross over the lines of the pattern.

The pattern may include lines which are parallel to each other and whose gap is ranging from 1 mm to 5 cm, a circle whose diameter is ranging from 1 mm to 5 cm, a polygon whose side length is ranging from 1 mm to 5 cm, a letter or picture whose line space is ranging from 1 mm to 1 cm.

The three-dimensional shape part may have a structure of cylinder, polyhedron or porous body.

The shape part may be conductive, and the collector may further include a separation layer disposed at a surface of the shape part.

The separation part may be one selected from a group consisting of a insulating polymer layer, a nonwoven, silicon film or paper.

The electrospinning may use a nozzle of a single or multiple mode.

Embodiments of the inventive concept provide a filter having a bottom surface and a sidewall connected from the bottom surface being composed of a polymer nanofiber and graphene particles or graphene oxide particles combined to the polymer nanofiber.

At least one pattern may be formed at the bottom surface and the sidewall.

The filter may further include a separation remaining polymer layer disposed between the bottom surface and the sidewall, wherein the separation remaining polymer layer may include none of graphene particles and graphene oxide particles.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 1 is a flowchart illustrating a method of fabricating a filter according to an example of the inventive concept;

FIG. 2 is a schematic view showing a part of a process of fabricating a filter according to an example of the inventive concept;

DETAILED DESCRIPTION OF THE EMBODIMENTS

Figure 3A:
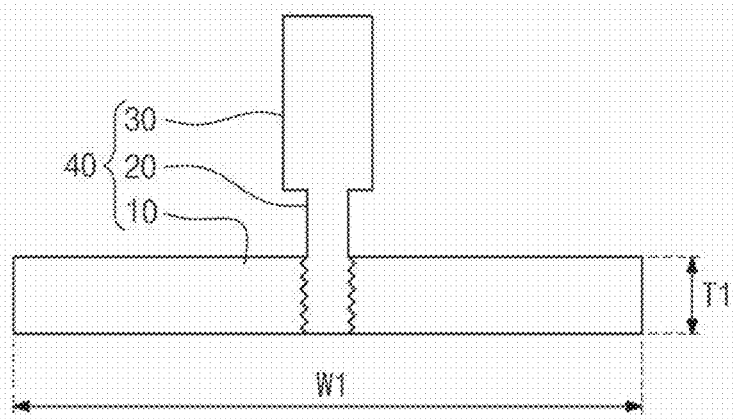
FIG. 3A is a cross-sectional view of a collector used for the process of fabricating a filter according to an example of the inventive concept.

Preferred embodiments of the present invention will be described below in more detail. The invention may, however, be embodied in many different forms and should not be construed as being limited to the embodiments set forth herein; rather, these embodiments are provided so that this disclosure will be thorough and complete, and will fully convey the concept of the invention to those skilled in the art.

FIG. 1 is a flowchart illustrating a method of fabricating a filter according to an example of the inventive concept. FIG. 2 is a schematic view showing a part of a process of fabricating a filter according to an example of the inventive concept.

Referring to FIGS. 1 and 2, first, a graphene-containing solution or a graphene oxide-containing solution is fabricated (first step, S10). The graphene-containing solution or the graphene oxide-containing solution can be fabricated by dispersing graphene particles or graphene oxide particles in a solvent. The solvent may be at least one selected from a group consisting of water, acetic acid ($C_2H_4O_2$), acetone ($C_3H_6O$), acetonitrile ($C_2H_3N$), benzene ($C_6H_6$), 1-butanol ($C_4H_{10}O$), 2-butanol ($C_4H_{10}O$), 2-butanone ($C_4H_8O$), t-butyl alcohol ($C_4H_{10}O$), carbon tetrachloride ($CCl_4$), chlorobenzene ($C_6H_5Cl$), chloroform ($CHCl_3$), cyclohexane ($C_6H_{12}$), 1,2-dichloroethane, ($C_2H_4Cl_2$), chlorobenzene, dichloromethane ($CH_2Cl_2$), ethyl ether ($C_4H_{10}O$), diethylene glycol ($C_4H_{10}O_3$), diglyme (diethylene glycol, dimethyl ether) ($C_6H_{14}O_3$), 1,2-dimethoxy-ethane (glyme, DME) ($C_4H_{10}O_2$), dimethylether ($C_2H_6O$), dimethyl-formamide (DMF) ($C_3H_7NO$), dimethyl sulfoxide (DMSO) ($C_2H_6OS$), dioxane ($C_4H_8O2$), ethanol ($C_2H_6O$), ethyl acetate ($C_4H_8O_2$), ethylene glycol ($C_2H_6O_2$), glycerin ($C_3H_8O_3$), heptanes ($C_7H_{16}$), hexamethylphosphoramide (HMPA) ($C_6H_{18}N_3OP$), hexamethylphosphorous triamide (HMPT) ($C_6H_{18}N_3P$), hexane ($C_6H_{14}$), methanol, ($CH_4O$), methyl t-butyl ether (MTBE) ($C_5H_{12}O$), methylene chloride, ($CH_2Cl_2$), N-methyl-2-pyrrolidinone (NMP) ($CH_5H_9NO$), nitromethane ($CH_3NO_2$), pentane ($C_5H_{12}$), petroleum ether (ligroine), 1-propanol ($C_3H_8O$), 2-propanol ($C_3H_8O$), pyridine ($C_5H_5N$), tetrahydrofuran (THF) ($C_4H_8O$), toluene ($C_7H_8$), triethyl amine ($C_6H_{15}N$), o-xylene ($C_8H_{10}$), m-xylene ($C_8H_{10}$), and p-xylene ($C_8H_{10}$).

Continuously, the graphene-containing solution or the graphene oxide-containing solution are mixed with a polymer to fabricate a graphene•polymer mixed solution (second step, S20). The polymer may be at least one selected from a group consisting of nylon-6,6), polyamide-6,6, polyurehthanes (PU), polybenzimidazole (PBI), polycarbonate (PC), polyacrylonitrile (PAN), polyvinyl alcohol (PVA), polylactic acid (PLA), polyethylene-co-vinyl acetate (PEVA), poly methyl methacrylate (PMMA), polyethylene oxide, polyaniline, (PANT), polystyrene (PS), polyvinylcarbazole, polyethylene terephthalate, (PET), polyvinyl phenol (PVP), polyvinylchloride (PVC), celluloid, cellulose acetate, polyacrylamide (PAAm), polycaprolactone (PCL), polyvinylidene fluoride (PVDF), polyetherimide, polyimide, polyethylene naphthalate (PEN), collagen, fibrin, chitosan and gelatin.

Continuously, referring to FIGS. 1 and 2, a conducting collector 40 of a three-dimensional shape is fabricated (third step, S30). This will be explained in more details.

FIG. 3A is a cross-sectional view of a collector used for the process of fabricating a filter according to an example of the inventive concept. FIGS. 3B through 3E are perspective views of a collector according to an example of the inventive concepts.

Figure 3B:
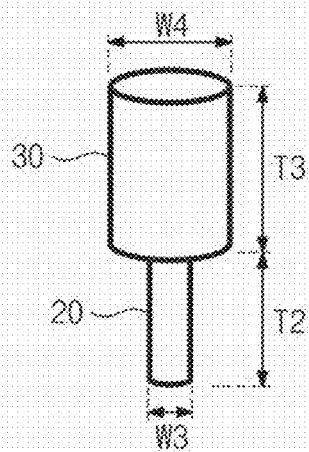
FIGS. 3B through 3E are perspective views of a collector according to an example of the inventive concepts.
Figure 3C:
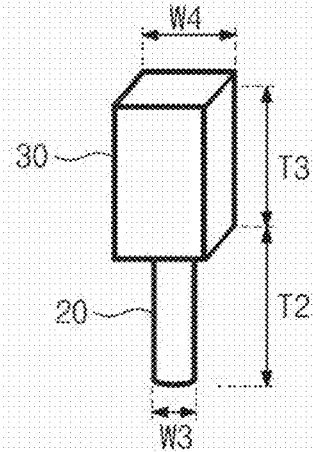
Figure 3D:
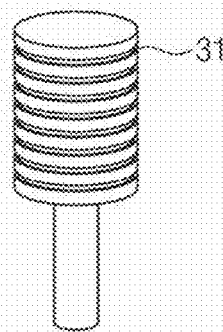
Figure 3E:
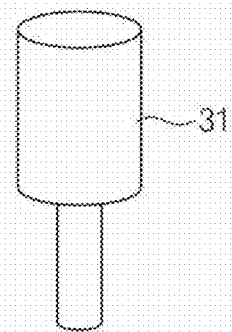

Referring to FIGS. 2 and 3A through 3E, the collector 40 includes a supporting substrate 10, a supporter 20 protruded from the supporting substrate 10 and a three-dimensional shape part 30 disposed on the support part 20. The collector 40 may be formed of a conductive material such as aluminum or copper. A lower end of the support part 20 can be combined to the supporting substrate 10 by a screw. The supporting substrate 10 may include a breadthwise width W1 and a lengthwise width W2. In one example, the breadthwise width W1 may be about 10 cm and the lengthwise width W2 may be about 1 cm. A vertical length T1 of the supporting substrate 10 may be about 1 cm. A width W3 of the support part 20 may be narrower than a width W4 of the shape part 30. The width W3 of the support part 20 may be about 0.5 cm. The width W4 of the shape part 30 may be about 1 cm. The vertical length T2 of the support part 20 may be about 2 cm. The vertical length T3 of the shape part 30 may be about 2 cm. The shape part 30 may have a cylinder or rectangular shape as shown in FIG. 3B. Alternatively, the shape part 30 may have a shape of a pyramid, polyhedron or porous body. As shown in FIG. 3D or 3E, a pattern 31 may be formed at a surface of the shape part 30. The pattern 31 may have a shape of a plurality of lines, circle, polygon, letter or picture.

Figure 4A:
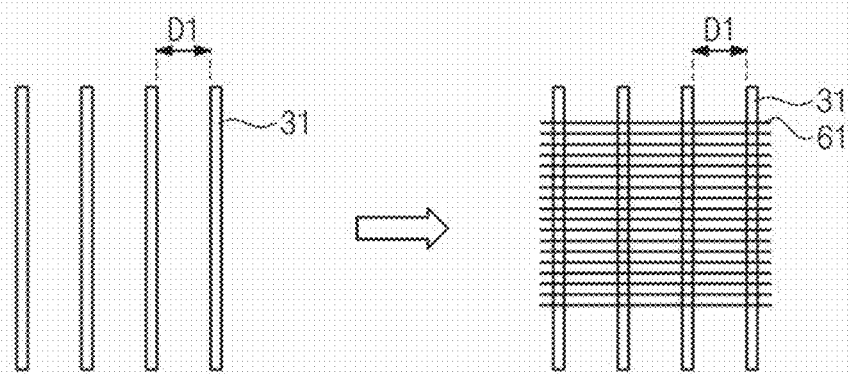
FIGS. 4A and 4B show shapes of patterns formed at a surface of a collector and shapes of polymer nanofibers formed on the patterns.
Figure 4B:
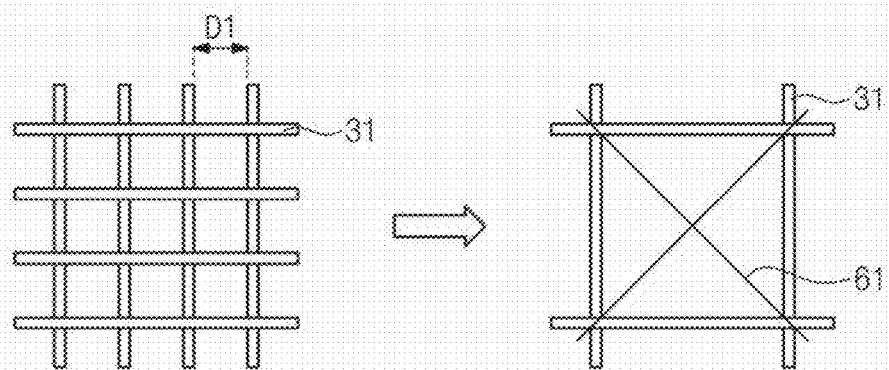

FIGS. 4A and 4B show shapes of patterns formed at a surface of a collector and shapes of polymer nanofibers formed on the patterns.

Referring to FIG. 4A, the pattern 31 may be composed of a plurality of lines which are parallel to each other. At this time, a gap D1 between the lines may be about 1 mm~5 cm. Alternatively, referring to FIG. 4B, the pattern 31 may be composed of a plurality of lines which are crossed to each other. At this time, a gap D1 between the lines may be about 1 mm~5 cm.

Referring to FIGS. 4A and 4B, if the pattern 31 has a circle shape, a diameter of the circle may be about 1 mm~5 cm. Alternatively, if the pattern 31 has a polygon shape, a length of one side of the polygon may be about 1 mm~5 cm. Alternatively, if the pattern 31 has a shape of letters or pictures, a gap between the letters or the pictures may be about 1 mm~1 cm.

A separation layer may be additionally disposed at a surface of the shape part 30 of the collector 40. The separation may be an insulating polymer layer, nonwoven, silicon film or paper.

After fabricating the collector 40, referring to FIGS. 1 and 2 again, the graphene•polymer mixed solution 60 is injected into a syringe 50 and electrospun onto a surface of the shape part 30 of the collector 40 through a nozzle 55 of the syringe 50 (fourth step, S40). At this time, a specific voltage may be applied to the syringe 50 and the collector 40. Consequently, it is possible to form a three-dimensional graphene•polymer complex filter containing a polymer nanofiber 61 and graphene particles of graphene oxide particles combined to the polymer nanofiber 61 at a surface of the shape part 30 of the collector 40. The nozzle 55 may be a single or multiple mode. If the nozzle 55 is a single mode, the nozzle 55 may have one hole. If the nozzle 55 is a multiple mode, the nozzle 55 may have two or more holes. For example, if the nozzle 55 is a dual mode, the nozzle 55 has two holes of first and second holes. But, the first hole may be disposed at a central and the second hole may surround the first hole.

Referring to FIGS. 4A and 4B, during the electrospinning process S40 of forming the filter, the polymer nanofiber 61 may be formed to cross over lines of the pattern 31.

Then, the three-dimensional graphene•polymer complex filter is separated from the shape part 30 of the collector 40 (fifth step, S50). A vacuum dry and thermal treatment may be performed for the separation process S50.

Since the filter fabrication method according to the present inventive concept employs the collector 40 of the three-dimensional shape part 30, patterns can be simply formed at a surface of the filter. This provides advantages at control of pressure difference which can be one of the very important factors necessary for designing and fabricating a filter.

In one example, before electrospinning (S40) the mixed solution at a surface of the shape part 30 of the collector 40, a separation polymer solution can be electrospun onto a surface of the shape part 30 of the collector 40 to form a separation layer. The separation polymer solution may not include a graphene particle or a graphene oxide particle. The separation polymer solution may include a polymer which can be easily melted by heat in order to be easily separated by heat from a surface of the shape part 30 during the separation process.

Figure 5A:
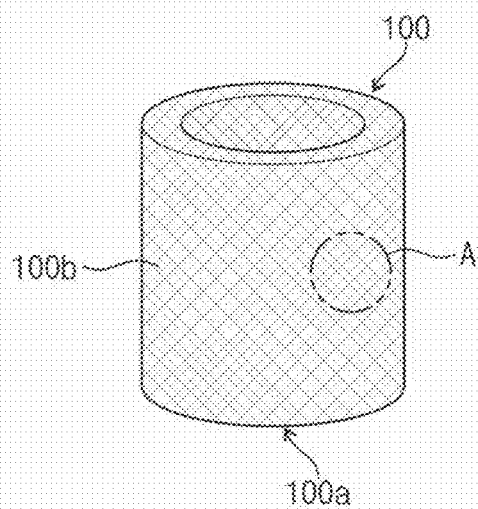
FIG. 5A is a perspective view of a filter fabricated without performing an electrospinning a separation polymer solution.
Figure 5B:
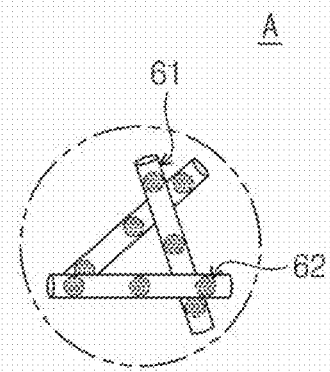
FIG. 5B is an enlarged view illustrating a portion A of FIG. 5A.

FIG. 5A is a perspective view of a filter fabricated without performing an electrospinning a separation polymer solution. FIG. 5B is an enlarged view illustrating a portion A of FIG. 5A.

Referring to FIGS. 5A and 5B, the graphene•polymer complex filter 100 may have a three-dimensional structure comprising a bottom surface 100a and a side surface 100b connected from the bottom surface 100a. The graphene•polymer complex filter 100 may have a shape of a cup. The graphene•polymer complex filter 100 may have the polymer nanofiber 61 and graphene particles 62 or graphene oxide particles combined to the polymer nanofiber 61 with being homogeneously dispersed. The polymer nanofiber 61 may have a diameter of 1~1000 nm. Since the filter 100 include graphene particles 62 or graphene oxide particles, the filter 100 can represent a superior antibiosis.

Figure 5C:
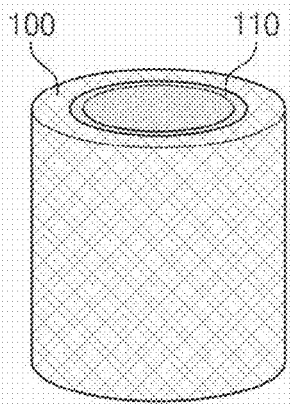
FIG. 5C is a perspective view of a filter fabricated after performing an electrospinning a separation polymer solution.

FIG. 5C is a perspective view of a filter fabricated after performing an electrospinning a separation polymer solution.

Referring to FIG. 5B, a separation remaining polymer layer 110 may remain at the inside of the filter 100. The separation remaining polymer layer 110 may not include graphene particles and graphene oxide particles.

At a surface of the filters 100 of FIGS. 5A and 5B, although not shown, patterns of shapes opposite to the patterns 31 of a surface of the shape part 30 can be formed. This provides advantages at control of pressure difference which can be one of the very important factors necessary for designing and fabricating a filter.

Experimental Example 1

Fabrication of a Three-Dimensional Graphene•Nylon Complex Filter

Figure 6:
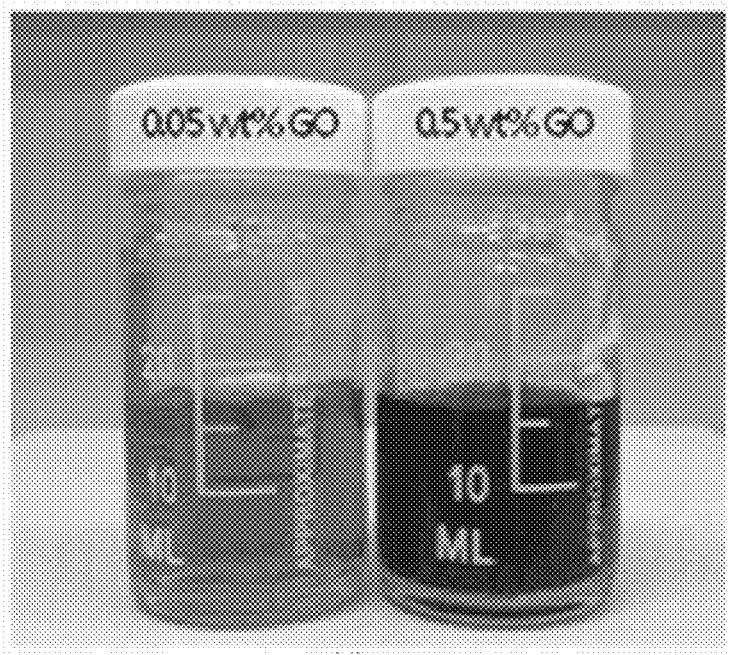
FIG. 6 is a photograph of graphene oxide-containing solutions fabricated in experiment example 1.

① According to the first step S10, a graphene oxide-containing solution was fabricated. First, SP-1 graphite powder of Bay Carbon Co. Ltd was treated by using modified Hummers and Offenmans method to fabricate graphene oxide. The graphene oxide powder was added by about 0.05~0.5 wt. % with respect to distilled water and the solution was dispersed during 4 hours by using an ultrasonic generator. A left photograph of FIG. 6 shows a graphene oxide-containing solution of 0.05 wt. % and a right photograph of FIG. 6 shows a graphene oxide-containing solution of 0.5 wt. %.

② The dispersed graphene oxide solution was centrifuged during 12 hours by a rate of 14000 rpm. Then a graphene oxide-containing solution was obtained but the remaining distilled water was removed. The graphene oxide-containing solution was mixed with formic acid of 50 mL and again dispersed during 4 hours.

Figure 7:
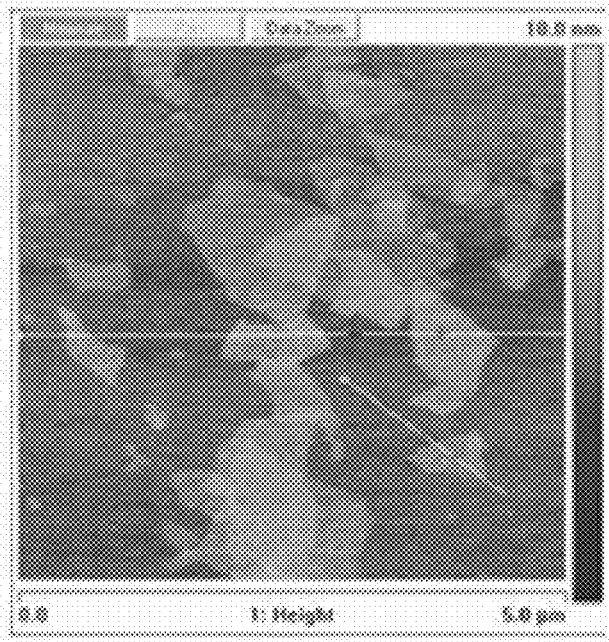
FIG. 7 is an atomic microscope photograph of a graphene oxide particle contained in a graphene•nylon complex solution fabricated in experiment example 1.

③ According to the second step S20, Nylon-6 of 20 g and the graphene oxide-containing solution of 50 mL were mixed and stirred during 4 hours by using a stirrer of 60° C. After 4 hours, it could obtain a graphene oxide•nylon mixed solution of dark gray color. In order to identify the state of the graphene oxide particles dispersed in the mixed solution, a part of the solution was put on a silicon substrate and its photograph was taken by an atomic microscope and provided in FIG. 7. Referring to FIG. 7, size of a graphene oxide particle was about 0.5~2.8 nm.

④ According to the third step S30, referring to FIGS. 2, 3A and 3B, a collector 40 having a three dimensional cylinder shape part 30 of aluminum was fabricated. At this time, a breadthwise width W1 of a supporting substrate 10 was 10 cm and a lengthwise width W2 thereof was 5 cm. A vertical thickness thereof was 1 cm. A width W3 of a support part 20 was 0.5 cm and a vertical thickness T2 thereof was 2 cm. A width W4 of a shape part 30 was 1 cm and a vertical thickness T3 thereof was 2 cm.

⑤ As a separation polymer solution, 5 wt. % polyethylene oxide solution was fabricated by mixing distilled water with polyethylene oxide whose molecular weight is 400K and whose surface characteristic is hydrophilic, different from that of nylon. The 5 wt. % polyethylene oxide solution was injected into a syringe having 30 G nozzle and electrospun to the collector in conditions of applied voltage 7 kV, distance between the syringe and the collector 10 cm and the solution injecting rate 0.1 ml/h. Then, the collector was dried in a vacuum oven during 24 hours to form a separation polymer layer.

⑥ According to the fourth step S40, the graphene oxide nylon mixed solution was injected into a 10 ml syringe having 25 G nozzle and then electrospun to the collector coated with the separation polymer layer in conditions of applied voltage 5~30 kV, distance between the syringe and the collector 10 cm and the solution injecting rate 0.2 ml/h to fabricate a graphene oxide nylon complex.

⑦ According to the fifth step S50, in order to separate the graphene oxide•nylon complex from the collector, the collector with the graphene oxide nylon complex was dried in a vacuum oven of 50° C. during 7 days and then thermally treated during 1 hours at 150° C. The separation polymer layer was melted by heat and the graphene oxide•nylon complex was separated from the collector to fabricate a graphene oxide•nylon complex filter.

⑧ The graphene oxide nylon complex filter was deoxidized into a graphene•nylon complex filter by a room temperature vapor method using a HI-AcOH (hydriodic acid with acetic acid) solution. More particularly, the graphene oxide•nylon complex filter was reacted with a mixed solution of 2 ml iodized hydracid and 5 ml nitric acid in a sealed glass reactor during 24 hours at 40° C. Then, a deoxidized graphene•nylon complex filter was obtained.

Figure 8:
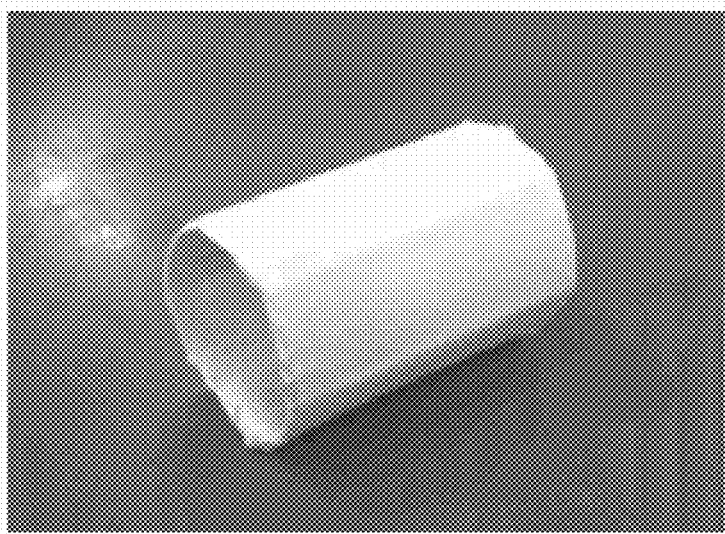
FIG. 8 is a photograph of a graphene•nylon complex filter fabricated in experiment example 1.

A photograph of the graphene•nylon complex filter was shown in FIG. 8. Referring to FIG. 8, it is possible to see a white three-dimensional graphene•nylon complex filter of a cylinder cup shape.

Figure 9:
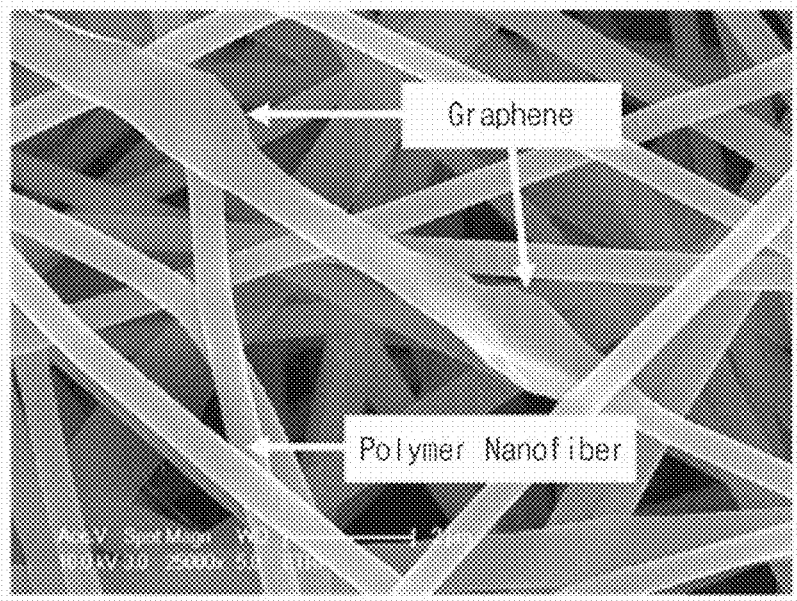
FIG. 9 is an electronic microscope photograph taken by enlarging a part of a filter of FIG. 8.

FIG. 9 is an electronic microscope photograph taken by enlarging a part of a filter of FIG. 8. Referring to FIG. 9, a polymer nanofiber and a graphene particle combined to the polymer nanofiber are seen. A diameter of a graphene particle is about 1-2 μm and thicker than that of the polymer nanofiber.

Experimental Example 2

Fabrication of a Three-Dimensional Graphene•Polystyrene Complex Filter

Figure 10:
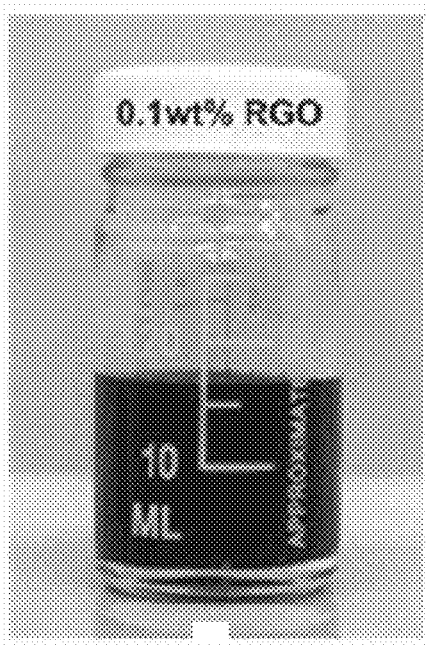
FIG. 10 is a photograph of a graphene-containing solution fabricated in experimental example 2.

① According to the first step S10, a graphene powder was fabricated by deoxidizing the graphene oxide powder with HI-AcOH. In order to fabricate a solution in which the graphene powder is homogenously dispersed, 47 mg graphene powder was mixed with 50 ml dimethyl-formamid and dispersed during 2 hours using an ultrasonic generator, thereby fabricating a 0.1 wt. % graphene-containing solution in FIG. 10.

Figure 11:
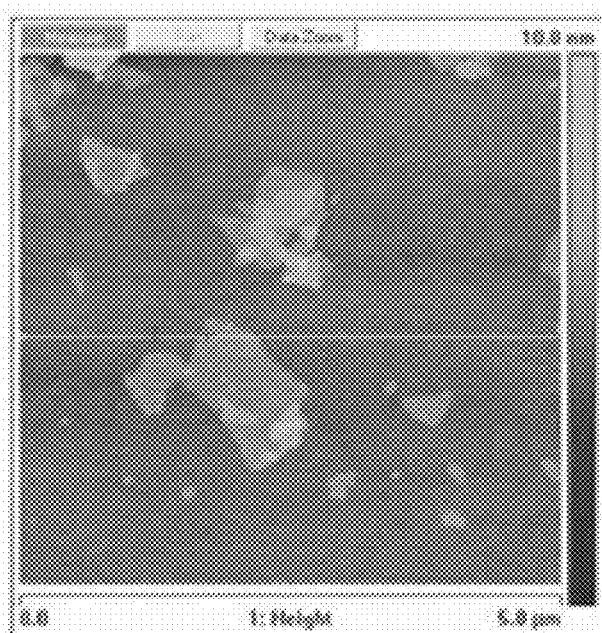
FIG. 11 is an atomic microscope photograph of a graphene particle contained in a graphene polystyrene mixed solution fabricated in experimental example 2.

② According to the second step S20, polystyrene of 20 g and the graphene-containing solution of 50 mL were mixed and stirred during 4 hours by using a stirrer of 60° C. After 4 hours, it could obtain a graphene•polystyrene mixed solution of dark gray color. In order to identify the state of the graphene particles dispersed in the mixed solution, a part of the solution was put on a silicon substrate and its photograph was taken by an atomic microscope and provided in FIG. 11. Referring to FIG. 11, size of a graphene particle was about 0.5~2 nm.

③ According to the third step S30, the collector 40 was fabricated by the same method as the Experimental example 1.

④ According to the fourth step S40, the graphene•polystyrene mixed solution was injected into a 10 ml syringe having 25 G nozzle and then electrospun to the collector in conditions of applied voltage 5~30 kV, distance between the syringe and the collector 10 cm and the solution injecting rate 0.2 ml/h to fabricate a graphene•polystyrene complex.

⑤ According to the fifth step S50, the graphene polystyrene complex was dried in a vacuum oven of 50° C. during 7 days and then separated from the collector to fabricate a three-dimensional graphene•polystyrene complex filter.

Like this, according to the method of fabricating a three-dimensional graphene•polymer complex filter of the present inventive concept, a three-dimensional graphene•polymer complex filter can be easily fabricated with various shapes and sizes and used for filters at various fields such as water purifier, incinerator, absorber, air conditioner and air cleaner.

Furthermore, no additional process is required for making a filter to have a three-dimensional shape. By forming various patterns at a surface of a collector, patterns can be simply formed at a surface of a filter. This provides advantages at control of pressure difference which can be one of the very important factors necessary for designing and fabricating a filter.

Since the filter according to the present inventive concept includes graphene particles homogeneously combined to the polymer nanofiber, the filter can represent a superior antibiosis.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of fabricating a filter, comprising:
fabricating a graphene-containing solution or a graphene oxide-containing solution;
fabricating a graphene-polymer mixed solution by mixing a polymer with the graphene-containing solution or with the graphene oxide-containing solution;
fabricating a conducting collector of a three-dimensional shape;
forming a three dimensional graphene•polymer complex filter by electrospinning the mixed solution to a surface of the collector; and
separating the three-dimensional graphene•polymer complex filter from the collector,
wherein the collector comprises a supporter part and a three-dimensional shape part disposed on the supporter part,
wherein the three-dimensional graphene•polymer complex filter is formed to cover an upper surface and a sidewall of the shape part.

2. The method of claim 1, wherein fabricating the graphene-containing solution or the graphene oxide-containing solution comprises dispersing graphene particles or graphene oxide particles in a solvent.

3. The method of claim 2, wherein the solvent is at least one selected from a group consisting of water, acetic acid ($C_2H_4O_2$), acetone ($C_3H_6O$), acetonitrile ($C_2H_3N$), benzene ($C_6H_6$), 1-butanol ($C_4H_{10}O$), 2-butanol ($C_4H_{10}O$), 2-butanone ($C_4H_8O$), t-butyl alcohol ($C_4H_{10}O$), carbon tetrachloride ($CCl_4$), chlorobenzene ($C_6H_5Cl$), chloroform ($CHCl_3$), cyclohexane ($C_6H_{12}$), 1,2-dichloroethane, ($C_2H_4Cl_2$), chlorobenzene, dichloromethane ($CH_2Cl_2$), ethyl ether ($C_4H_{10}O$), diethylene glycol ($C_4H_{10}O_3$), diglyme (diethylene glycol, dimethyl ether) ($C_6H_{14}O_3$), 1,2-dimethoxy-ethane (glyme, DME) ($C_4H_{10}O_2$), dimethylether ($C_2H_6O$), dimethyl-formamide (DMF) ($C_3H_7NO$), dimethyl sulfoxide (DMSO) ($C_2H_6OS$), dioxane ($C_4H_8O2$), ethanol ($C_2H_6O$), ethyl acetate ($C_4H_8O_2$), ethylene glycol ($C_2H_6O_2$), glycerin ($C_3H_8O_3$), heptanes ($C_7H_{16}$), hexamethylphosphoramide (HMPA) ($C_6H_{18}N_3OP$), hexamethylphosphorous triamide (HMPT) ($C_6H_{18}N_3P$), hexane ($C_6H_{14}$), methanol, ($CH_4O$), methyl t-butyl ether (MTBE) ($C_5H_{12}O$), methylene chloride, ($CH_2Cl_2$), N-methyl-2-pyrrolidinone (NMP) ($CH_5H_9NO$), nitromethane ($CH_3NO_2$), pentane ($C_5H_{12}$), petroleum ether (ligroine), 1-propanol ($C_3H_8O$), 2-propanol ($C_3H_8O$), pyridine ($C_5H_5N$), tetrahydrofuran (THF) ($C_4H_8O$), toluene ($C_7H_8$), triethyl amine ($C_6H_{15}N$), o-xylene ($C_8H_{10}$), m-xylene ($C_8H_{10}$), and p-xylene ($C_8H_{10}$).

4. The method of claim 1, wherein the polymer is at least one selected from a group consisting of nylon-6,6), polyamide-6,6, polyurehthanes (PU), polybenzimidazole (PBI), polycarbonate (PC), polyacrylonitrile (PAN), polyvinyl alcohol (PVA), polylactic acid (PLA), polyethylene-co-vinyl acetate (PEVA), poly methyl methacrylate (PMMA), polyethylene oxide, polyaniline, (PANI), polystyrene (PS), polyvinylcarbazole, polyethylene terephthalate, (PET), polyvinyl phenol (PVP), polyvinylchloride (PVC), celluloid, cellulose acetate, polyacrylamide (PAAm), polycaprolactone (PCL), polyvinylidene fluoride (PVDF), polyetherimide, polyimide, polyethylene naphthalate (PEN), collagen, fibrin, chitosan and gelatin.

5. The method of claim 1, further comprising:
electrospinning a separation polymer solution to the surface of the collector before electrospinning the mixed solution to the surface of the collector.

6. The method of claim 1, wherein a pattern of a line, circle, polygon, letter or picture is formed on a surface of the shape part.

7. The method of claim 6, wherein the pattern comprises a plurality of lines,
wherein the three-dimensional graphene•polymer complex filter comprises a polymer nanofiber, and graphene particles or graphene oxide particles combined with the polymer nanofiber, and
wherein the polymer nanofiber is formed to cross over the lines of the pattern.

8. The method of claim 6, wherein the pattern comprises lines which are parallel to each other and are spaced apart by a gap ranging from 1 mm to 5 cm.

9. The method of claim 6, wherein the pattern comprises a circle having a diameter ranging from 1 mm to 5 cm.

10. The method of claim 6, wherein the pattern comprises a polygon having a side length ranging from 1 mm to 5 cm.

11. The method of claim 6, wherein the pattern comprises a letter or picture having lines spaced by a length ranging from 1 mm to 1 cm.

12. The method of claim 1, wherein the three-dimensional shape part has a structure of cylinder, polyhedron or porous body.

13. The method of claim 1, wherein the shape part is conductive, and the collector further comprises a separation layer disposed on the upper surface or the side surface of the shape part.

14. The method of claim 13, wherein the separation part is one selected from a group consisting of an insulating polymer layer, a nonwoven layer, a silicon film, or a paper.

15. The method of claim 1, wherein the mixed solution is electrospun using a nozzle of a single or a multiple mode.

16. A method, comprising:
forming a graphene polymer mixed solution by mixing a polymer with a graphene-containing solution or with a graphene oxide-containing solution;
forming a three-dimensional graphene polymer complex filter by electrospinning the graphene polymer mixed solution on an upper surface and a sidewall of a shape part of a collector, the sidewall having a three-dimensional pattern; and
separating the three-dimensional graphene•polymer complex filter from the collector,
wherein the collector includes a supporter part and the shape part disposed on the supporter part.

* * * * *